United States Patent [19]

Yamaguchi

[11] Patent Number: 4,560,182
[45] Date of Patent: Dec. 24, 1985

[54] BICYCLE

[76] Inventor: Kiyoshi Yamaguchi, 22-26, Showa-Cho, Atami-Shi, Japan

[21] Appl. No.: 581,604

[22] Filed: Feb. 21, 1984

[30] Foreign Application Priority Data

Feb. 23, 1983 [JP] Japan ................................. 58-027657

[51] Int. Cl.⁴ .............................................. B62M 1/02
[52] U.S. Cl. .................................... 280/257; 280/259
[58] Field of Search ............... 280/259, 260, 261, 262, 280/257, 256

[56] References Cited

U.S. PATENT DOCUMENTS

| | | | |
|---|---|---|---|
| 546,954 | 9/1895 | Decker | 280/261 |
| 4,029,334 | 6/1977 | Trammell, Jr. | 280/261 |
| 4,159,652 | 7/1979 | Trammell, Jr. | 280/259 |

*Primary Examiner*—Joseph F. Peters, Jr.
*Assistant Examiner*—Donn McGiehan
*Attorney, Agent, or Firm*—Shlesinger, Arkwright, Garvey & Fado

[57] ABSTRACT

A torque generating mechanism for a chain drive system of a bicycle which comprises a main shaft fixed with a chain wheel and a first gear, an auxiliary shaft arranged parallel to the main shaft, a second gear fixed to the auxiliary shaft so as to mesh with the first gear, a first lever fixed to the auxiliary shaft, a first crank lever pivotally connected to the free end of the first lever and formed with a guide slot which is engaged with a protruding pin formed eccentrically of the chain wheel, an auxiliary lever fixed to the other end of the main shaft and provided with a protruding pin at the top end thereof, a second lever fixed to the other end of the auxiliary shaft, a second crank lever pivotally connected to the second lever and provided with a guide slot which is engaged with the protruding pin, and a pair of pedals pivotally connected to the free end of each crank lever. The crank lever can move in a noncircular path so that the pedal is moved in the most forward position when the rider applies the pedaling force, thereby increasing torque for driving the bicycle.

4 Claims, 3 Drawing Figures

BICYCLE

BACKGROUND OF THE INVENTION

The present invention relates generally to a bicycle with an improved driving system. More specifically, the present invention relates to an improvement in a torque generating mechanism for rotating a drive wheel by pedaling.

Generally a bicycle is driven by gear cranks which are rotated by pedaling so that a rear wheel is rotated by a chain wheel to which the gear cranks are connected, and a drive chain extending between the drive wheel and the chain wheel.

The simplest way to increase the rotational torque of a conventional bicycle is to make the gear crank arms as long as possible. However, the optimum length of the gear crank arm is determined by human limitations. If this length is too long, pedaling is difficult or impossible.

SUMMARY OF THE INVENTION

Therefore with this problem in mind, it is an object of the present invention to provide an improved torque generating mechanism for a bicycle so that there is no trouble in pedaling the bicycle.

To accomplish the above object of the present invention, a torque generating mechanism is installed in the lower section of a bicycle frame and comprises a main shaft and an auxiliary shaft arranged parallel to each other a predetermined distance apart; a pair of members including a front chain wheel and first gear are coaxially fixed to one end of the main shaft; a second gear is fixed to one end of the auxiliary shaft, the second gear being meshed with the first gear; a first lever is fixed to an end of the auxiliary shaft at one end thereof; a first crank lever is pivotally connected to the free end of the first lever, the first crank lever being formed with a guide slot in substantially the center portion thereof; a first pedal is pivotally connected to free end of the first crank lever; a protruding pin is eccentrically fixed to the front chain wheel, the protruding pin being engaged with the guide slot; a drive chain extends between the front chain wheel and a rear chain wheel of the rear wheel; an auxiliary lever is fixed to the other end of the main shaft; a second lever is fixed to the other end of the auxiliary shaft; a second crank lever is pivotally connected to the second lever at the end thereof, the second crank lever being formed with a guide slot; a protruding pin is fixed to the free end of the auxiliary lever, which is engaged with the guide slot, and a second pedal is pivotally connected to free end of the second crank lever.

By this arrangement, the torque generating mechanism increases torque for rotating a drive wheel so that there is no trouble in pedaling the bicycle.

BRIEF DESCRIPTION OF THE DRAWINGS

The present invention will be understood from the detailed description given herebelow and from the accompanying drawings of the preferred embodiment of the present invention, which, however, should not be taken to limit the invention but is for illustration only.

In the drawings.

DESCRIPTION OF THE PREFERRED EMBODIMENT

Figure 1:
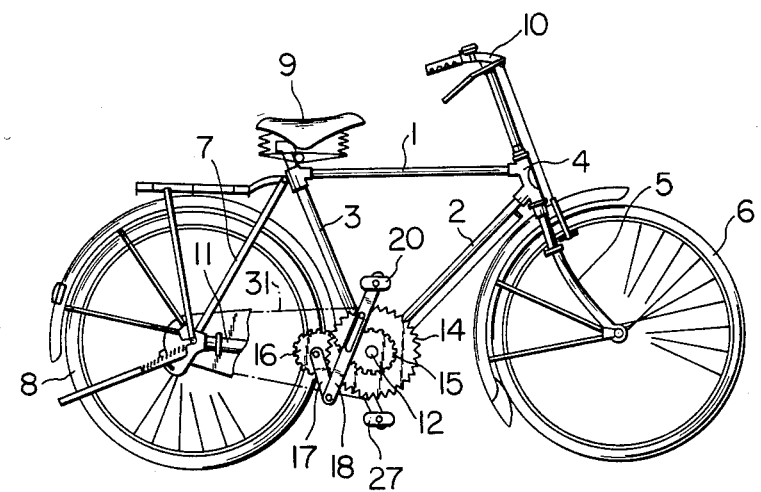
FIG. 1 is a side elevational view showing the preferred embodiment of the present invention.

Referring to FIG. 1, there is shown a bicycle which is equipped with the torque generating mechanism of the present invention. In the drawing, there is illustrated a bicycle which is of conventional construction except for the driving system. The bicycle comprises an upper pipe member 1, a lower pipe member 2, a vertical pipe member 3, a front pipe member 4, a front fork 5, a front wheel 6, a rear fork 7, a rear wheel 8, a saddle 9 and a handle 10. The lower pipe 2 and the vertical pipe member 3 are connected to each other by a bottom stay 11 at their lower ends. This bottom stay 11 is provided with a main shaft 12 and an auxiliary shaft 13 which are arranged in predetermined spaced parallel relation.

Figure 2:
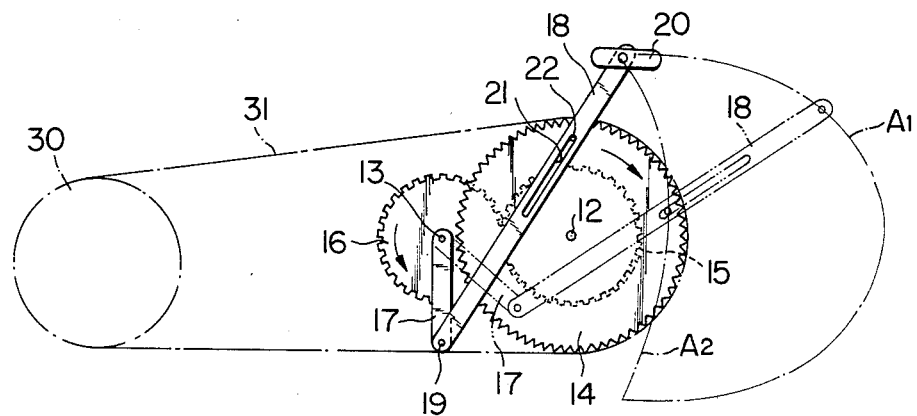
FIG. 2 is an enlarged elevational view of the torque generating mechanism forming a part of the present invention.

FIG. 2 illustrates the torque generating mechanism of the present invention. On one side of the stay 11 (the right side with respect to the forward direction of the bicycle), the main shaft 12 is fixedly engaged with a front chain wheel 14 and a first gear 15. The auxiliary shaft 13 is also fixedly engaged with a second gear 16 having the same member and size gear teeth as the first gear 15. Further, one end of a first lever 17 is fixed to the end of the auxiliary shaft 13, and the other end is pivotally connected to one end of a first crank lever 18 through a pivot pin 19. The first crank lever 18 is relatively long in comparison with the first lever 17. The other end of the first crank lever 18 is connected to a right pedal 20. The first crank lever 18 is further provided, near the center thereof, with a guide slot 21 in which a protruding pin 22 eccentrically fixed to the chain wheel 14 is inserted.

Figure 3:
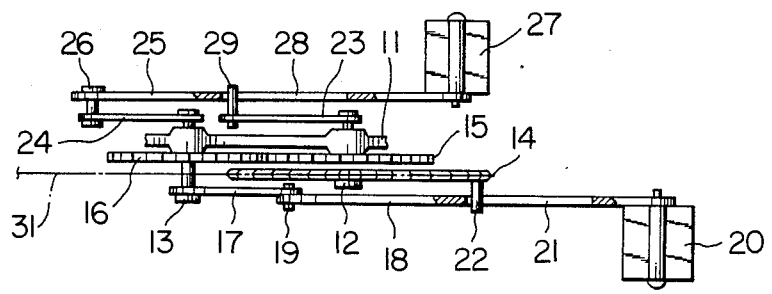
FIG. 3 is a top plan view of the torque generating mechanism of FIG. 2.

As shown in FIG. 3, the other end (located on the left side of the bottom stay 11) of the main shaft 12 is fixedly engaged with an auxiliary lever 23, and the auxiliary shaft 13 is also fixed to a second lever 24. The other end of the second lever 24 is pivotally connected to one end of second crank lever 25 through a pivot pin 26. The other end of the second crank lever 25 is provided with a left pedal 27. The second crank lever 25 is also formed with a guide slot 28 in the same manner as the first crank lever 18 in which slot a pin 29, fixed to the end of the auxiliary lever 23 connected to the main shaft 12, is inserted.

A drive chain 31 is trained over the front chain wheel 14 fixed to the main shaft 13 and extends to a rear chain wheel 30 of the rear wheel 8.

In the above construction, the length of the auxiliary lever 23 is effectively equal to the radius of the front chain wheel 14. The protruding pin 29 is 180° out of phase with the protruding pin 22 formed on the front chain wheel 14.

An operation of the torque generating mechanism according to the present invention as set out above will be explained.

Referring to FIG. 2, as a rider steps downwardly with pedal 20 positioned at the top position, the front chain wheel 14 is rotated in the direction of the arrow together with the guide slot 21 formed in the first crank lever 18 and the protruding pin 22 fixed to the front chain wheel 14. At the same time, the first gear 15, coaxially fixed to the front chain wheel 14, is also rotated in the same direction so that the second gear 16, which is meshed with the first gear 15, is forcibly rotated in the reverse direction of the front chain wheel 14. Thus, the first lever 17, fixed to the auxiliary shaft 13, is also rotated in the same direction as the second gear 16, so that the first crank lever 18 is rotated with sliding movement towards the pedal 20. Due to this sliding movement, the effective length of the crank lever 18 between the pedal 20 and the main shaft 12 is increased. This length reaches its maximum when the crank lever 18 and the first lever 17 are in alignment, without overlapping each other; that is, when the pedal 20 reaches its angular position of 90° from its top position. After passing the angular position of 90°, the effective length becomes shorter and then returns to the initial length when the pedal 20 reaches the angular position of 90° from the maximum position. This angular movement is represented by the path $A_1$ in FIG. 2.

Such pedaling motion is continued through an angle of 180° from the top position to the bottom position. Thereafter, the pedal 20 is returned to the top position through the path $A_2$.

When the right pedal 20 is located at the top position of angular movement, the left pedal 27 is located at the bottom position 180° out of phase with right pedal 20. As the main shaft 12 and the auxiliary shaft 13 are rotated in response to the pedaling motion of the right pedal 20, the crank lever 25, supporting the left pedal 27 is moved together with the protruding pin 29 fixed to the auxiliary lever 23 and the second lever 24. As a result, the left pedal 27 is returned to the top position from the bottom position through the path $A_2$.

In this way, a rider successively steps downwardly on the right or left pedal positioned at the top of its angular movement, so that the front chain wheel 14 can continue rotating and the rotational power is transmitted to the rear chain wheel 30 through the drive chain 31.

By means of this construction, the effective length of the crank levers 18 and 25 is substantially extended as the pedal is rotated downwardly at about 90° from the top of its angular movement by pedaling, thereby increasing torque for driving the rear wheel. These extended crank levers 18 and 25 do not cause any difficulty in pedaling since the crank lever is extended through a range of 90° from the top of angular movement. Further, the pedal is returned from the bottom position to the top position through the path $A_2$; i.e., quick returning motion, so that pedaling cycle per unit time can be increased.

It will be understood by those skilled in the art that the foregoing description is in terms of a preferred embodiment of the present invention wherein various changes and modifications may be made without departing from the spirit and scope of the invention as set forth in the appended claims.

What is claimed is:

1. In a bicycle having a handle, a front wheel a rear wheel, a saddle and a frame, a torque generating mechanism for driving the rear wheel which comprises
   a main shaft pivotally supported at the lower section of the frame;
   an auxiliary shaft pivotally supported at the lower section of the frame, said auxiliary shaft being arranged in parallel rotation to said main shaft and at a predetermined distance from said main shaft;
   a front chain wheel and first gear axially fixed to one end of said main shaft;
   a second gear fixed to one end of said auxiliary shaft, said second gear being meshed with said first gear;
   a first lever, one end of which is fixed to the end of said auxiliary shaft at one end thereof;
   a first crank lever pivotally connected to the free end of said first lever, said first crank lever being provided with a guide slot substantially in the center thereof;
   a first pedal pivotally connected to the free end of said first crank lever;
   a protruding pin eccentrically fixed to said front chain wheel, said protruding pin being engaged with said guide slot;
   a rear chain wheel fixed to said rear wheel;
   a drive chain extending between said front chain wheel and said rear chain wheel;
   an auxiliary lever fixed to the other end of said main shaft;
   a second lever fixed to the other end of said auxiliary shaft;
   a second crank lever pivotally connected to said second lever at the end thereof, said second crank lever being formed with a guide slot;
   a protruding pin fixed to the free end of said auxiliary lever, said protruding pin being engaged with said guide slot, and
   a second pedal pivotally connected to the free end of said second crank lever, whereby torque for rotating the rear wheel can be increased by successively operating said pedals 2. A torque generating mechanism for a bicycle, as set forth in claim 1, wherein said protruding pin formed on said first chain wheel, and said protruding pin formed on said auxiliary lever, are arranged 180° out of phase.

3. A torque generating mechanism for a bicycle, as set forth in claim 1, wherein the length of said auxiliary lever is effectively equal to the radius of said first chain wheel.

4. A torque generating mechanism for a bicycle, as set forth in claim 1, wherein, during a portion of the operational cycle, said crank levers and said levers are aligned in a straight line without overlapping each other, so that the effective crank lever is of maximum length.

* * * * *